(12) United States Patent
Gill et al.

(10) Patent No.: US 9,720,300 B2
(45) Date of Patent: *Aug. 1, 2017

(54) DUAL-TAP ELECTRO-OPTIC MODULATOR AUTO-BIAS CONTROL

(71) Applicant: INTERNATIONAL BUSINESS MACHINES CORPORATION, Armonk, NY (US)

(72) Inventors: Douglas M. Gill, South Orange, NJ (US); Jonathan E. Proesel, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/672,814

(22) Filed: Mar. 30, 2015

(65) Prior Publication Data

US 2015/0316796 A1 Nov. 5, 2015

Related U.S. Application Data

(60) Provisional application No. 61/987,008, filed on May 1, 2014.

(51) Int. Cl.
*G02F 1/225* (2006.01)
*G02F 1/21* (2006.01)
(Continued)

(52) U.S. Cl.
CPC ............ *G02F 1/225* (2013.01); *G02F 1/0123* (2013.01); *G02F 1/035* (2013.01); *G02F 1/21* (2013.01);
(Continued)

(58) Field of Classification Search
CPC .................. H04B 10/541; G02F 1/011; G02F 2001/0113; G02F 1/0115; G02F 1/0121;
(Continued)

(56) References Cited

U.S. PATENT DOCUMENTS 3,780,296 A 12/1973 Waksberg et al.
4,071,751 A * 1/1978 Waksberg ............. G02F 1/0123
250/201.1
(Continued)

OTHER PUBLICATIONS

Ackerman et al., "Bias controllers for external modulators in fiber-optic systems", May 1, 2001, Lightwave online, vol. 18, issue 5, pp. 1-10.*
(Continued)

*Primary Examiner* — John M Bedtelyon
(74) *Attorney, Agent, or Firm* — Cantor Colburn LLP; Vazken Alexanian

(57) ABSTRACT

A method and apparatus for controlling operation of an electro-optic modulator is disclosed. A first intensity of light is obtained at an input to the electro-optic modulator. A second intensity of light is obtained at an output of the electro-optic modulator. A difference between the obtained first intensity and the obtained second intensity is used to control a biasing of a modulator transfer function of the electro-optic modulator to control the electro-optic modulator.

10 Claims, 5 Drawing Sheets

(51) Int. Cl.
*G02F 1/035* (2006.01)
*G02F 1/01* (2006.01)
*H04B 10/54* (2013.01)

(52) U.S. Cl.
CPC ..... *H04B 10/541* (2013.01); *G02F 2001/212* (2013.01)

(58) Field of Classification Search
CPC ...... G02F 1/0123; G02F 1/0147; G02F 1/025; G02F 1/0327; G02F 1/035; G02F 1/21; G02F 2001/212; G02F 1/225; G02F 1/2252
See application file for complete search history.

(56) References Cited

U.S. PATENT DOCUMENTS

| | | | |
|---|---|---|---|
| 5,003,624 | A | 3/1991 | Terbrack et al. |
| 5,400,417 | A | 3/1995 | Allie et al. |
| 6,661,556 | B2 | 12/2003 | Bond et al. |
| 7,046,414 | B2 | 5/2006 | Ohhira |
| 7,106,486 | B1 | 9/2006 | Nahapetian et al. |
| 7,697,793 | B2* | 4/2010 | Webster ................. G02F 1/025 385/14 |

OTHER PUBLICATIONS

C. Li, et al., "A ring-resonator-based silicon photonics transceiver with bias-based wavelength stablization and adaptive-power-sensitivity receiver," 2013 IEEE International Solid-State Circuits Conference (ISSCC), Feb. 14-17, 2013, pp. 124-125.

C. Li, et al., "A ring-resonator-based silicon photonics transceiver with bias-based wavelength stablization and adaptive-power-sensitivity receiver," 2013 IEEE International Solid-State Circuits Conference, Feb. 14-17, 2013, slide presentation, 36 pages.

K. Padmaraju, et al., "Integrated Thermal Stabilization of a Microring Modulator," Optical Fiber Communication Conference, Optical Society of America, Mar. 7, 2013, OM2H.7, 3 pages.

T. Kataoka, et al., "Novel Automatic Bias Voltage Control for Travelling-Wave Electrode Optical Modulators," Electronics Letters, vol. 27, No. 11, 1991; pp. 943-945.

List of IBM Patents or Patent Applications Treated as Related; (Appendix P), Filed Jun. 19, 2015 2 pages.

Douglas M. Gill et al., "Dual-Tap Electro-Optic Modulator Auto-Bias Control", U.S. Appl. No. 14/743,577, filed Jun. 18, 2015.

* cited by examiner

DUAL-TAP ELECTRO-OPTIC MODULATOR AUTO-BIAS CONTROL

CROSS-REFERENCE TO RELATED APPLICATIONS

The present application claims priority from U.S. Provisional Application Ser. No. 61/987,008, titled "DUAL-TAP ELECTRO-OPTIC MODULATOR AUTO-BIAS CONTROL", filed on May 1, 2014, which is incorporated by reference herein in its entirety.

BACKGROUND

The present disclosure relates to biasing of electro-optic modulators and, in particular, to a method and apparatus for providing an auto-bias control of an electro-optic modulator.

Electro-optic modulators may be used to convert an electrical signal to an optical signal. In general, the electrical signal modulates a constant optical beam to change the intensity and/or phase of the optical beam in agreement with the modulations of the electrical signal. The quality with which the electro-optic modulator transfers signals from the electrical domain to the optical domain depends, in part, on the point in the modulator transfer function at which the modulator is operated at, often referred to as the modulator operational bias point. Since a transmitter modulator operational bias point can change with temperature and/or time, the quality of the electro-optic modulator output is also temperature-dependent.

SUMMARY

According to one embodiment, a method of controlling operation of an electro-optic modulator includes: obtaining a first intensity of light at an input to the electro-optic modulator; obtaining a second intensity of light at an output of the electro-optic modulator; and using a difference between the obtained first intensity and the obtained second intensity to control a biasing of a modulator transfer function of the electro-optic modulator to control the operation of the electro-optic modulator.

According to another embodiment, an apparatus for controlling operation of an electro-optic modulator includes: a first optical tap configured to tap input light that is input to the electro-optic modulator; a second optical tap configured to tap output light that is output from the electro-optic modulator; and a circuit configured to generate a control signal based on a difference between an intensity of the input light and an intensity of the output light to control a bias point of operation on a modulator transfer function of the electro-optic modulator to control the operation of the electro-optic modulator.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
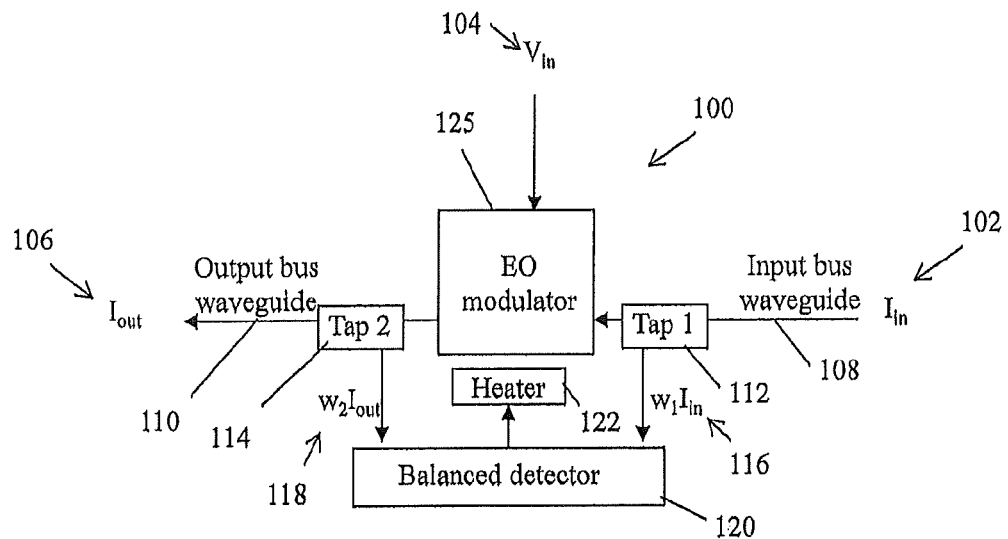
FIG. 1 shows an illustrative auto-biasing circuit for an electro-optic modulator in one embodiment of the present invention.

FIG. 1 shows an illustrative auto-biasing circuit 100 for an electro-optic modulator 125 in one embodiment. The circuit 100 includes an electro-optic modulator 125 that receives an optical input signal $I_{in}$ (102) and a modulator signal $V_{in}$ (104) which may be an electric signal and generates an optical output signal $I_{out}$ (106) that corresponds to the received modulator signal 104. Optical input signal $I_{in}$ 102 may be received at the electro-optic modulator 125 via an input bus waveguide 108 and optical output signal $I_{out}$ 106 may be transmitted from the electro-optic modulator 125 via output bus waveguide 110. In various embodiments, one or more of the input bus waveguide 108 and output bus waveguide 110 may be a fiber optic cable. In one embodiment, the optical input signal 102 may be a constant beam of light such as a beam of light received from a continuous-wave laser. The modulator signal 104 may include a signal that alternates between two voltage levels, such as 0 Volts (V) and 1 V in order to represent binary digits '0' and '1'. The optical output signal $I_{out}$ 106 therefore includes a signal that alternates between intensity and/or phase levels representative of binary digits '0' and '1'.

A first optical tap 112, shown as Tap 1, is disposed along the input bus waveguide 108 and taps a percentage $w_1$ (where $0<w_1<1$) of the optical input signal $I_{in}$ 102. Similarly, a second optical tap 114, shown as Tap 2, is disposed along the output bus waveguide 110 and taps a percentage $w_2$ (where $0<w_2<1$) of the optical output signal $I_{out}$ 106. The tapped input light $(w_1 I_{in})$ 116 of the optical input signal 102 and the tapped output light $(w_2 I_{out})$ 118 of the optical output signal 106 are sent to a balanced detector 120. The balanced detector 120 compares the intensities of the tapped input light and the tapped output light (i.e., $w_1 I_{in}$ and $w_2 I_{out}$) and controls the operation of an optical phase shifter 122 based on the comparison of the intensities. The optical phase shifter 122 may be used to bias a modulator transfer function of the electro-optic modulator 125 as discussed below with respect to FIGS. 3-5. In various embodiments, the optical phase shifter 122 may be a heater or heating element and the balanced detector 120 may supply a control current to the optical phase shifter 122 (i.e., heater) in order to alter a temperature at a specific location within the modulator. In general, the electro-optic modulator 125 may be properly biased when the tapped input light and tapped output light are of equal intensities, or in other words, when $w_1 I_{in} = w_2 I_{out}$. In one embodiment, the balanced detector 120 increases a current to the optical phase shifter 122 when $w_1 I_{in} < w_2 I_{out}$, decreases a current to optical phase shifter 122 heater when $w_1 I_{in} > w_2 I_{out}$, and maintains a current to the optical phase shifter 122 when $w_1 I_{in} = w_2 I_{out}$. In one embodiment, the current from the balanced detector 120 may be zero when $w_1 I_{in} = w_2 I_{out}$.

The percentages $w_1$ and $w_2$ are selected so that the tapped input light $w_1 I_{in}$ 116 is equal to the tapped output light $w_2 I_{out}$ 118 when the modulator transfer function is properly balanced. In general, $w_2$ is greater than $w_1$ to account for optical losses in the electro-optic modulator 125, and also because even without loss in the electro-optic modulator, the output signal $I_{out}$ will be (for certain modulation formats) about half of the intensity of the input signal $I_{in}$ because $I_{out}$ modulates between low intensity states ('0') and high intensity states ('1') while $I_{in}$ stays at a high intensity state.

Since the output optical signal 106 alternates between light intensities, a measurement of light intensity at any given time may yield either a full optical intensity (corresponding to a '1' digit) or no optical intensity (corresponding to a '0' digit). The optical taps 112 and 114 measure light intensity over an extended time duration to obtain an average light intensity over the time duration. Increasing the time duration of averaging therefore allows the alternations of $I_{out}$ between '0' and '1' to be averaged out due to the statistical law of large numbers, thereby leaving a measurement of average output light intensity. The averging function can be realized through use of an element within the control circuit that inherently has a 'slow' response compared to data transmission rate, such as the heater used to control the modulator operation bias point. Thus, it is generally desirable to have a slow enough component in the control circuit to damp out variations in optical transmitter output '1' and '0' states.

Figure 2:
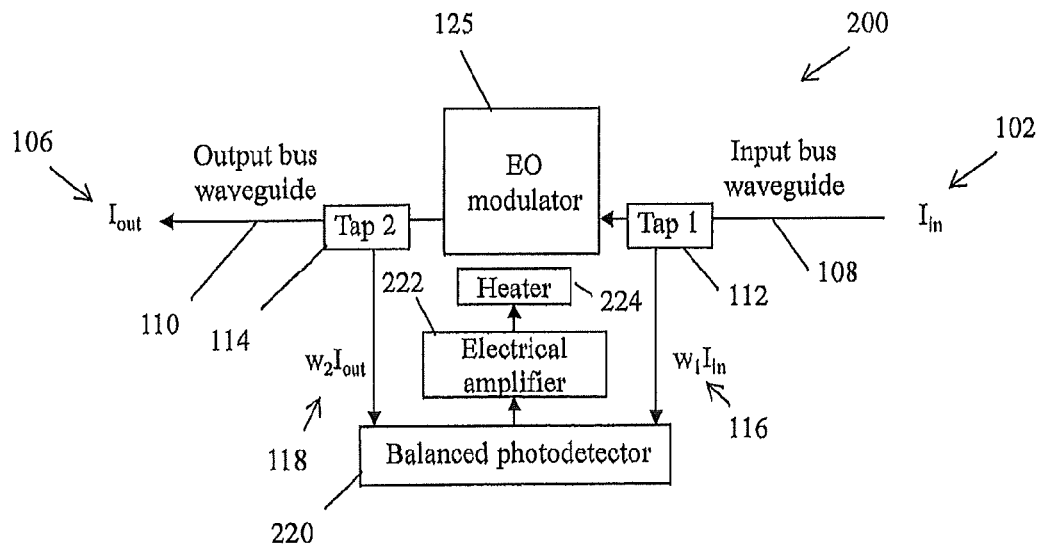
FIG. 2 shows another embodiment of an auto-biasing circuit for an electro-optic modulator.

FIG. 2 shows another embodiment of an auto-biasing circuit 200 for an electro-optic modulator 125 in one embodiment. Optical input signal $I_{in}$ 102 is transmitted via input bus waveguide 108 to the electro-optic modulator 125 and is modulated by an electrical signal (not shown). The resulting output signal $I_{out}$ 106 is transmitted from the electro-optic modulator 125 via output bus waveguide 110. First optical tap 112 taps a first percentage ($w_1 I_{in}$) of the optical input signal $I_{in}$ 102 and sends the tapped input light 116 to balanced photodetector 220. Similarly, second optical tap 114 taps a second percentage ($w_2 I_{out}$) of the optical output signal $I_{out}$ 106 and sends the tapped output light 118 to the balanced photodetector 220. The balanced photodetector 220 generates a control signal (e.g., a control voltage or control current) having a magnitude that is based on a comparison of $w_1 I_{in}$ and $w_2 I_{out}$. The control signal from the balanced photodetector 220 is amplified at electrical amplifier 222 and is then sent to heater 224. Heat from the heater 224 biases the modulator transfer function of the electro-optic modulator 125, as discussed below with respect to FIGS. 3-5.

Figure 3:
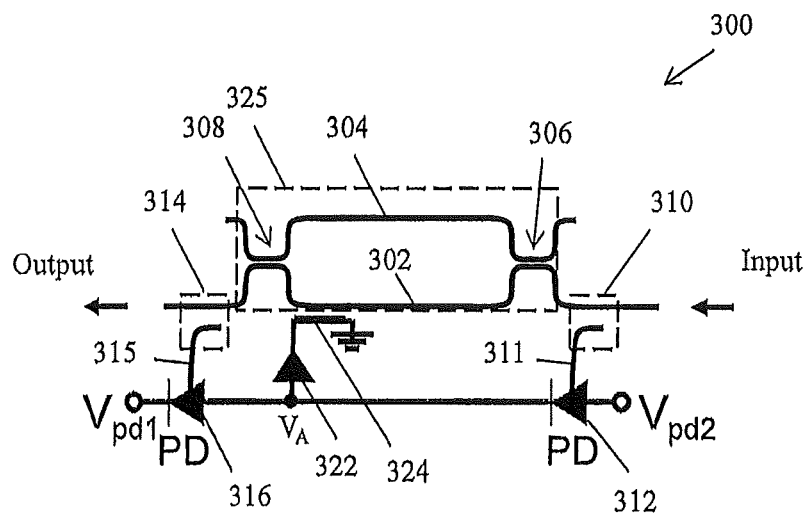
FIG. 3 shows a detailed schematic of the auto-biasing circuit of FIG. 2.

FIG. 3 shows a detailed schematic 300 of the auto-biasing circuit of FIG. 2. An electro-optic modulator 325 is shown having optical waveguides 302 and 304. Optical waveguides 302 and 304 optically couple at directional couplers 306 and 308. Optical input signal $I_{in}$ is transmitted along optical waveguide 302, and a modulating signal is transmitted along optical waveguide 304. The directional couplers 306 and 308 allow the modulating signal in optical waveguide 304 to generate an output optical signal $I_{out}$ in waveguide 302 having the waveform of the modulating signal. First optical tap 310 is, in one embodiment, a directional coupler that includes an optical fiber (or waveguide) 311 that is brought within proximity of the optical waveguide 302 prior to the electro-optic modulator 325 to tap a percentage $w_1$ of the optical input signal $I_{in}$ to obtain a tapped input signal. The optical fiber 311 delivers the tapped input signal to photodiode 312. Similarly, second optical tap 314 is, in one embodiment, a directional coupler that includes an optical fiber (or waveguide) 315 that is brought within proximity of the optical waveguide 302 after the electro-optic modulator 325 to tap a percentage $w_2$ of the output optical signal $I_{out}$ to obtain a tapped output signal. The optical fiber 315 delivers the tapped output signal to photodiode 316. Photodiodes 312 and 316 control a voltage $V_A$ between photodiode 312 and photodiode 316 to be between $V_{pd2}$ and $V_{pd1}$ respectively. The voltage $V_A$ is applied at one end of electrical amplifier 322 and causes a current to flow through heater 324. The heater 324 heats the optical waveguide 302 to cause the optical waveguide 302 change its optical path length. By increasing the current, more heat is applied to a segment of the optical waveguide 302 between the directional couplers 306 and 308, thereby causing the optical path length of the segment to increase, thereby causing the optical phase at the end of waveguide 302 to change in one direction. By decreasing the current, less heat is applied to the segment, thereby causing the optical path length of the segment to be reduced, which causes the optical phase at the end of waveguide 302 to change in an opposite direction. Changing the optical path length of optical waveguide 302 between directional couplers 306 and 308 changes the modulator operation bias point, which changes the range of operation the modulator operates at within the modulator transfer function as discussed below with respect to FIGS. 4 and 5. In general, the control signal maintains a proper biasing of the modulator transfer function based on the difference, or a comparison, of the tapped input signal and the tapped output signal.

Figure 4:
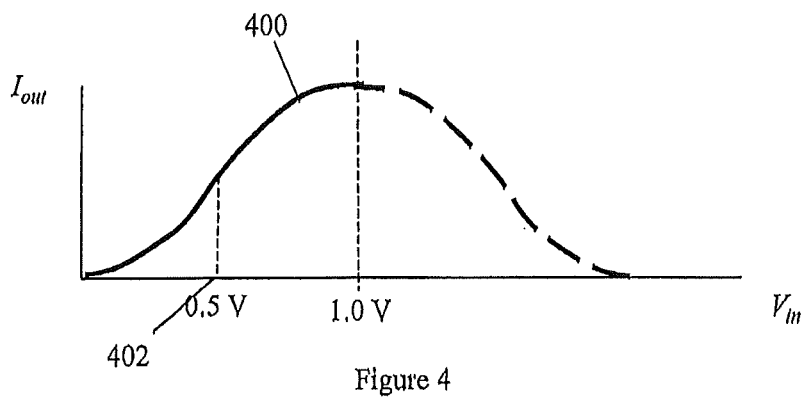
FIG. 4 shows a modulator transfer function related to the electro-optic modulator of FIG. 3.

FIG. 4 shows a modulator transfer function 400 that is related to the electro-optic modulator 325 of FIG. 3. The modulator transfer function 400 shows a relation between the voltage $V_{in}$ of the modulator signal and the intensity $I_{out}$ of the optical output signal The voltage of the modulator signal provided to the electro-optic modulator 325 is shown along the x-axis and the intensity of the output signal $I_{out}$ is shown along the y-axis. In various embodiments, the modulator transfer function 400 is a sinusoidal function and the modulation of the modulator signal occurs over a generally linear region centered at a selected central voltage, which is shown in FIG. 4 as 0.5 volts, although any suitable central voltage may be used. The central voltage is selected so that an increase in $V_{in}$ increases the light intensity of $I_{out}$ and a decrease in $V_{in}$ decreases the light intensity of the $I_{out}$, although in alternate embodiments an opposite polarity relation could be used between the input electrical and output optical signals. A portion of the sinusoidal function within 0 volts and 1 volts is shown in solid line, while portions outside of this voltage region are shown in dotted lines. The location of the modulator transfer function 400 along the x-axis is related to the difference in the optical path lengths of optical waveguides 302 and 304 between directional couplers 306 and 308. Therefore, changing the difference in the optical path lengths, for example, by heating optical waveguide 302 to change its length and/or optical refractive index, moves or "biases" the modulator transfer function along the x-axis. The modulator transfer function 400 of FIG. 4 is considered properly biased.

Figure 5:
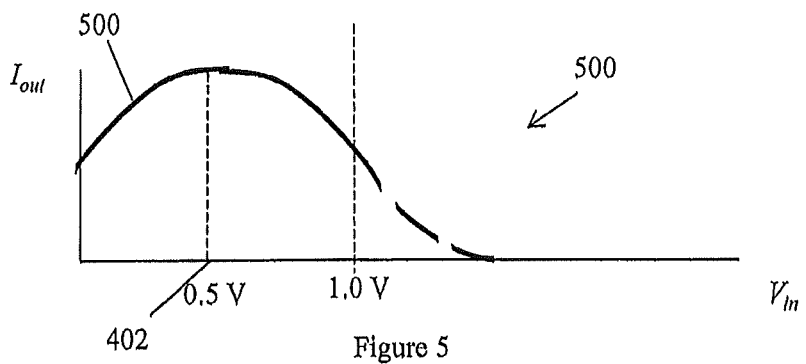
FIG. 5 shows a modulator transfer function of an electro-optic modulator that is improperly biased.

FIG. 5 shows a modulator transfer function 500 of an electro-optic modulator 325 that is improperly biased. The modulator transfer function 500 has moved to the left with respect to the properly biased modulator transfer function 400 of FIG. 4.

The peak of the modulator transfer function 500 is centered at the central voltage 402 (i.e., 0.5 V). Thus, at $V_{in}=0.5$ V, an increase in $V_{in}$ as well as a decrease in $V_{in}$ both lead to a decrease in light intensity $I_{out}$, thereby leading to improper transfer of the signal from the modulator signal to the output optical signal. The auto-biasing circuit as shown, for example, in FIG. 3 is configured to move the modulator transfer function 500 along the x-axis into a properly-biased location along the x-axis, such as shown in FIG. 4.

Figure 6:
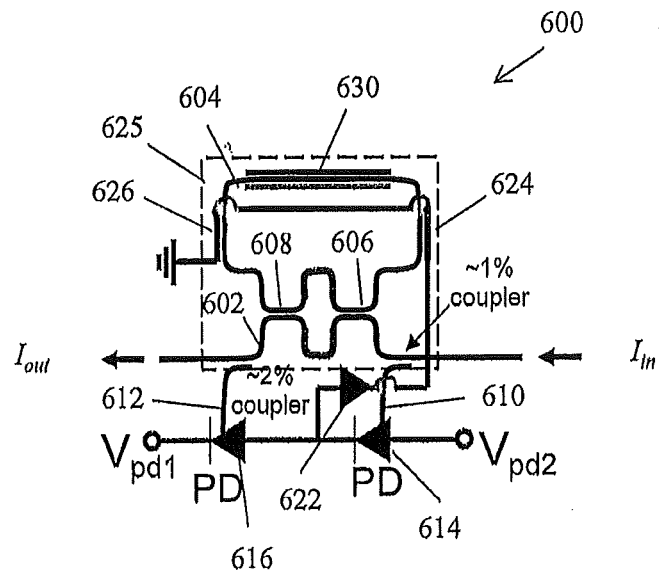
FIG. 6 shows an auto-biasing circuit for a ring electro-optic modulator.

FIG. 6 shows an auto-biasing circuit 600 for a ring electro-optic modulator 625. The ring electro-optic modulator 625 includes a first waveguide 602 that receives an optical input signal $I_{in}$ and outputs an optical output signal $I_{out}$. The ring electro-optic modulator 625 also includes a second waveguide 604 that is in the form of a ring. The second waveguide 604 couples to the first waveguide at two directional couplers 606 and 608. A segment of the second waveguide 604 is coupled to a high-speed phase shifter 630 which creates a modulated optical signal in the second waveguide 604 and therefore, via the directional couplers 606 and 608, creates a modulated optical output signal $I_{out}$. Optical couplers 610 and 612 tap the optical input signal $I_{in}$ and the optical output signal $I_{out}$, respectively, to photodetectors 614 and 616, respectively, via the methods disclosed with respect to FIG. 3. Imbalance between the tapped light intensities creates a current that is amplified at amplifier 622 to control heating elements 624 and 626. Controlling the heating elements 624 and 626 controls a length of an optical path length of the second waveguide 604 and thus, a position of the modulator transfer function along an x-axis, as shown in FIGS. 8 and 9.

Figure 7:
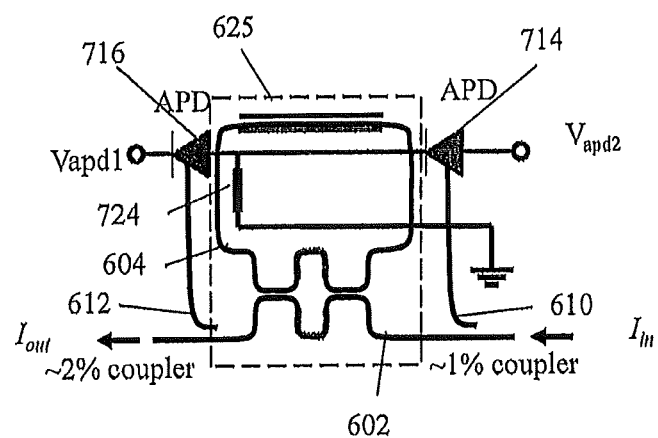
FIG. 7 shows an alternate embodiment of an auto-biasing circuit for a ring electro-optical modulator.

FIG. 7 shows an alternate embodiment of an auto-biasing circuit 700 for a ring electro-optical modulator 625. The ring electro-optic modulator 625 includes a first waveguide 602 that receives an optical input signal $I_{in}$ and generates an optical output signal $I_{out}$ and a second waveguide 604 that is in the form of a ring. The tapped input signal from coupler 710 and the tapped output signal from coupler 712 are sent to avalanche photodiodes 714 and 716, respectively. The avalanche photodiodes 714 and 716 control a current flow through heating element 724. The controlled current controls heating element 724 and thereby controls the length of the ring resonator waveguide 704. Using avalanche photodiodes 714 and 716 allows operation of the auto-biasing circuitry without resorting to use of an electrical amplifier.

Figure 8:
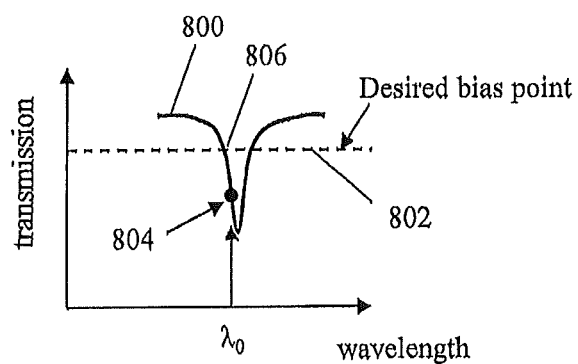
FIG. 8 shows a modulator transfer function for the illustrative ring electro-optic modulators of FIGS. 6 and 7.

FIG. 8 shows a modulator transfer function 800 for a ring electro-optic modulator, such as the ring electro-optic modulators shown in FIGS. 6 and 7. Wavelength is shown along the x-axis and output signal intensity is shown along the y-axis. The modulator transfer function 800 is shown as a curve having a dip to a minimum value. The location of the modulator transfer function along the x-axis is controlled via the biasing circuitry described with respect to FIGS. 6 and 7. The central wavelength $\lambda_0$ of the laser (i.e., the input signal) identifies an initial bias point 804 of the modulator transfer function 800. A desired bias point 806 is shown by intersection of dotted line 802 with the modulator transfer function 800.

Figure 9:
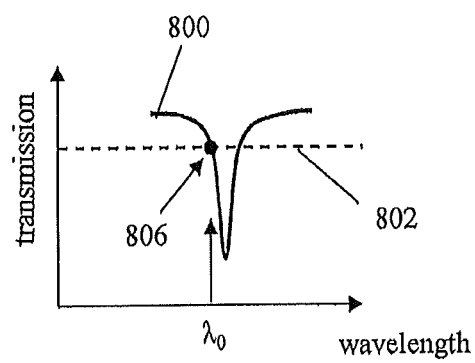
FIG. 9 shows a properly-biased modulator transfer function for a ring electro-optic modulator.

FIG. 9 shows a properly-biased modulator transfer function for a ring electro-optic modulator. The modulator transfer function 800 has been moved along the x-axis so that the laser wavelength $\lambda_0$ selects the desired bias point 806. Motion along the x-axis is related to an increase and/or decrease of the optical path length of second waveguide 604 via the heating element.

Figure 10:
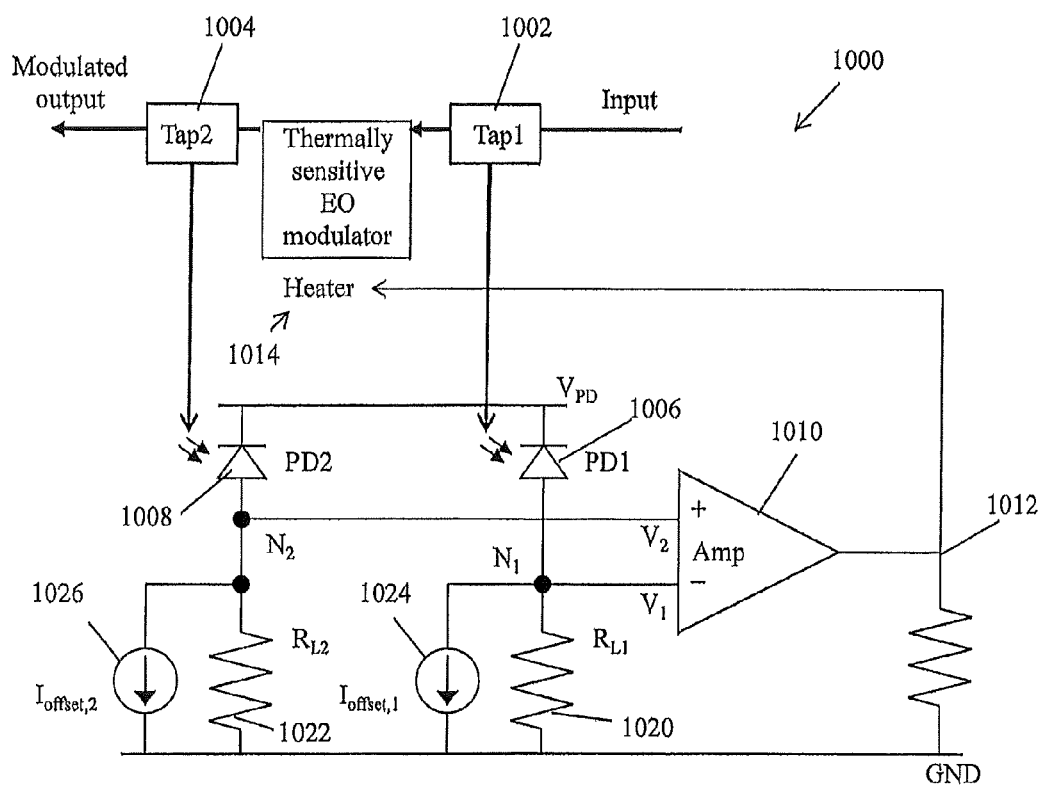
FIG. 10 shows an illustrative circuit for auto-biasing illustrative electro-optic modulators disclosed herein.

FIG. 10 shows an illustrative circuit 1000 for auto-biasing illustrative electro-optic modulators disclosed herein. Photodiodes PD1 (1006) and PD2 (1008) receive light from Tap 1 (1002) and Tap 2 (1004) respectively and convert the light intensities to currents. The current from PD1 (1006) is converted to voltages $V_1$ at node $N_1$ via the load resistor $RL_1$ 1020. The current from PD2 (1008) is converted to a voltage $V_2$ at node $N_2$ via the load resistor $RL_2$ 1022. The voltages $V_1$ and $V_2$ are input to differential voltage amplifier 1010. The difference between $V_1$ and $V_2$ is amplified by the differential voltage amplifier 1010 to produce a voltage signal 1012 that drives the heater 1014. $I_{offset,1}$ (1024) and $I_{offset,2}$ (1026) compensate for mismatches and offsets in the photodiodes (1006, 1008), resistors (1020, 1022) and differential voltage amplifier 1010 by subtracting current from nodes $N_1$ and $N_2$ as appropriate.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While exemplary embodiments of the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An apparatus for controlling operation of an electro-optic modulator, comprising:
   a first optical tap configured to tap input light that is input to the electro-optic modulator;

a second optical tap configured to tap output light that is output from the electro-optic modulator, wherein the electro-optic modulator includes two coupled optical waveguides for producing the output light from the input light; and a circuit configured to generate a control signal for heating one of the two coupled optical waveguides to control a bias point of operation on a modulator transfer function of the electro-optic modulator that relates an intensity of light at the output of the electro-optic modulator to a wavelength, wherein the control signal is based on a difference between an intensity of the input light and an intensity of the output light.

2. The apparatus of claim 1, wherein the control signal is configured to control operation of a heating element coupled to the one of the two coupled optical waveguides to control the bias of the modulator transfer function.

3. The apparatus of claim 2, wherein the circuit includes a differential amplifier that drives the heating element based on the difference.

4. The apparatus of claim 2, wherein the heating element is configured to change an optical path length of the one of the two coupled optical waveguides of the electro-optic modulator.

5. The apparatus of claim 1, wherein the circuit heats the one of the two coupled optical waveguides to move the modulator transfer function so that a wavelength of a laser providing of the input light is at a selected bias point.

6. The apparatus of claim 1, wherein the circuit is further configured to convert an intensity of the tapped input light to a first voltage input to an operational amplifier and convert an intensity of the tapped output light to a second voltage input to the operational amplifier, wherein the difference between the first voltage input and the second voltage input drive the operational amplifier to provide the control signal for controlling the modulator transfer function.

7. The apparatus of claim 1, wherein the first optical tap taps a first percentage of light at the input to the electro-optic modulator and second optical tap taps a second percentage of light at the output by the electro-optic modulator, wherein the first percentage and the second percentage are selected so that the first percentage of the input light is substantially equal to the second percentage of the output light when the electro-optic modulator is properly biased.

8. The apparatus of claim 1, wherein the electro-optic modulator is one of a Mach-Zehnder interferometer and a ring resonator modulator.

9. The apparatus of claim 1, wherein the light at the input to the electro-optic modulator is a continuous wave laser light.

10. The apparatus of claim 1, wherein the light at the output alternates between a '0' state and a '1' state and the circuit is configured to respond to an average intensity of the tapped output light over a time period to reduce the effect of alternation of the output light on the tapped output light over a time period.

* * * * *